May 6, 1930.                J. R. HALL ET AL                1,757,860
                SIDE SCREEN OR CURTAIN FOR MOTOR VEHICLES
                          Filed June 26, 1928
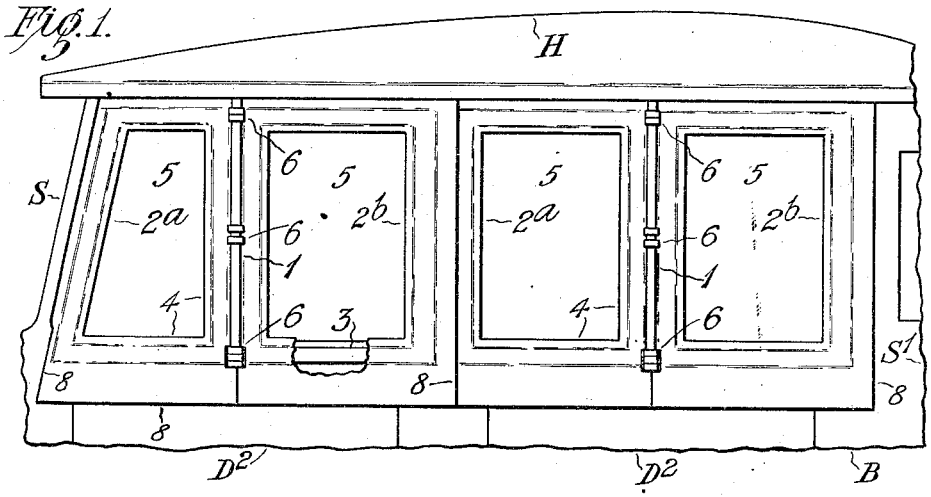
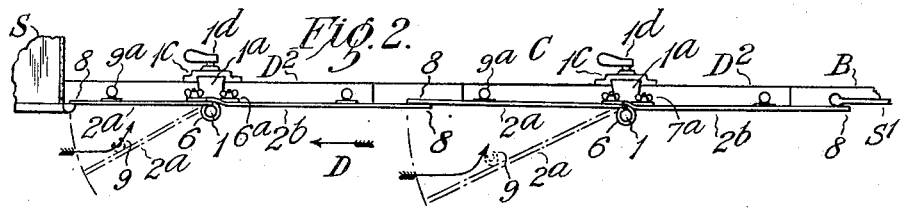
 
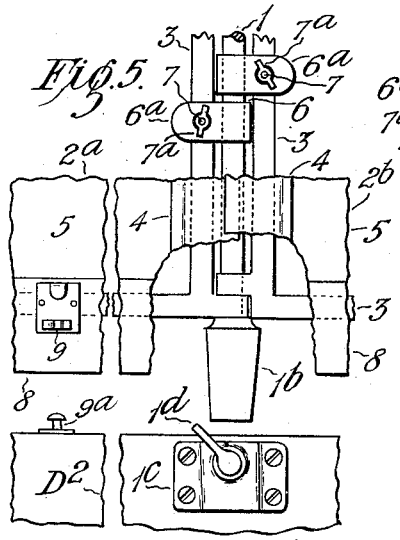 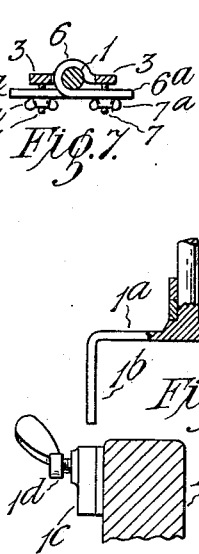 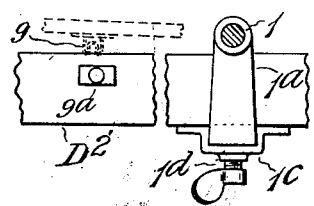
Inventors
J. R. Hall
K. C. McLeod
O. B. Heatley
by Wilkinson & Giusta
Attorneys.

Patented May 6, 1930

1,757,860

UNITED STATES PATENT OFFICE

JOHN RICHARD HALL, KENNETH CLARENCE McLEOD, AND OWEN BURGESS HEATLEY, OF MELBOURNE, VICTORIA, AUSTRALIA

SIDE SCREEN OR CURTAIN FOR MOTOR VEHICLES

Application filed June 26, 1928, Serial No. 288,397, and in Australia July 4, 1927.

One object of this invention is to provide, for a touring motor car or other vehicle, one or more detachable screens at each side, each having a member herein called a pillar, each screen having a section pivoted to and extending forwardly from the pillar, and also a section pivoted to and extending rearwardly from the pillar, which is supported by the car side or a car door, each such section being capable of swinging outwardly, and of being fixed in either open or closed position.

Hitherto, touring cars have, in many cases, when converted into closed cars by means of curtains, had an inferior appearance, and have in various respects lacked comfort. One effect of this invention is to enable a touring car to be given at will a resemblance to a limousine or sedan; but our screens can be used if desired without the use of hoods and front windscreens. Our screens enhance the value of motor cars, and promote health and comfort. Motor cars are referred to merely as examples of vehicles to which the invention is applicable.

The mounting of screens on car doors is herein described, that position being most effective; but, in some vehicles which have single side doors, and—rearwardly of said doors—body walls, one screen is applicable to said door and another to said wall, at each or either side of the car. In some single seated cars, one of our screen at each side suffices.

Our screen sections are windows, each of suitable shape and size, according to the area to be screened. Each screen is applicable and removable independently; and, according to its position and the adjustment of its sections, it excludes wind, rain, dust, and so on, from the car interior, or it admits and guides fresh air into that interior.

Any section can be fitted at will with a curtain, of roller blind type, for example.

An embodiment of the invention is herein described relatively to the accompanying drawings, which show one side of a car, but the construction can be modified to suit vehicle bodies of other types and designs.

In the drawings, which are diagrammatic, the scales vary.

Figure 1 is an elevation showing part of a motor car side having two doors, with one of our screens on each, Figure 2 is a plan of the car side and screens in Figure 1, the broken lines showing examples of positions into which a user may set and fix the front section or window of each screen, projecting outwardly to deflect air into the car as shown by arrows.

Figures 3 and 4 are plans of the car side with a section of each screen fully open and not projecting.

In Figure 3 the rear sections are swung forwardly;

In Figure 4 the front sections are swung rearwardly, and in each case desirable air spaces are provided.

In Figures 2 to 4 the car interior is at C, the direction of travel being shown by arrow D.

Figure 5 is a front elevation of a pillar foot with parts of sections attached to it; below these are parts of the door top. The screen is detached from the door, which carries a foot socket.

Figure 6 is a transverse sectional elevation of the detached pillar foot and door.

Figure 7 is a sectional plan of details of one form of section hinge.

Figure 8 is a plan of parts of a door top engaged by a pillar foot, broken lines showing part of a section secured by a catch.

B is the vehicle body. There may be a hood or top H, a windscreen S, and a rear curtain or side construction $S^1$, with which our screens will co-operate. $D^2$ are side doors, on each of which is mounted a removable screen, by means of the screen pillar 1, which has a base offset $1^a$ carrying a foot $1^b$, the offset enabling the pillar to stand over or outward of the outer face of the door, as indicated by Figures 6 and 8, giving passengers more clear space within the screen. The door supports the offset and thus the screen. Each door is fitted with a holding means of any suitable kind $1^c$ shown as a socket of rectangular cross section, the pillar foot corresponding, so that the pillar fits non-rotatably, and it is firmly held, as by a wing screw $1^d$.

The sections $2^a$ and $2^b$ are hinged or jointed to the pillar, 2ª extending forwardly, and 2ᵇ rearwardly. These sections can each swing if required about 180 degrees. They are shown pivoted by hinge eyes 6, and suitable eyes are shown—see Figure 7—with shanks 6ª each to receive a clamping device shown as a screw 7 carrying a wing nut 7ª which can be tightened to cause the eyes to tightly grip the pillar and hold the section firmly in any desired adjustment; but other fixing devices might—of course—be substituted. In like manner other section details may vary. In each section we find it practical to provide each window with a metal or wood frame 3 enclosed in a suitable rim 4 of leather, or somewhat flexible fabric, holding in place a pane 5 of suitable substance, for example celluloid. These rims are not new features. They enable the sections to act noiselessly, and they make joints which exclude dust, draughts, and rain.

To enable each section to be held closed— as in Figures 1 and 2—each door carries a catch shown by a stud 9ª, to be engaged by a section member shown as a U-shaped spring clip 9.

Section rims overlap at 8 in Figures 1 and 2, the rim of a front screen rear section overlapping the rim of a rear screen front section.

The front sections of front screens have front edges shaped and set to suit adjacent parts of the car to, when required, exclude wind, rain, and/or dust. The front of section 2ª is thus shown oblique, close to the oblique windscreen S.

To cause fresh air to enter a car just back of the windscreen the foremost front section is opened outwardly and to cause still more air to enter both front sections are opened. In Figure 3 front sections are closed and rear sections set fully forward to provide maximum open spaces. Figure 4 shows the front sections swung open to the maximum extent,—about 180 degrees—and thus not projecting. If swung open to a less extent these sections would obviously deflect a wind from the rear into the car, reversely to the effect in Figure 2. Another position in which all or any sections could be set, not illustrated, is open to the extent of 90 degrees, thus ensuring a larger amount of light and open space than has hitherto been possible when side screens are fitted. Such an adjustment would be practicable on some occasions.

As an obvious modification each section could be hinged to a separate pillar, the two pillars being parallel and close together.

We claim:

A side enclosure for touring cars having a body with side doors, a windshield and a top with a back section, comprising a socket on the inner side of each door, a pillar for each door having a flat inwardly offset foot piece detachably fitting in the respective socket with its angled portion seated across the top of the door to hold the pillar in outwardly offset relation to the door, a pair of closure sections for each pillar one extending forwardly and the other extending rearwardly of the pillar, the closure sections between the pillars overlapping and the front and rear closure sections adapted to engage the windshield and the back section respectively for closing in the side of the car, and hinge clamping means for supporting the closure sections on the pillar and securing the sections in adjusted position thereon.

In witness whereof we have hereunto signed our names to this specification at Melbourne, in the State of Victoria, in Australia, this 29th day of May, 1928.

JOHN RICHARD HALL.
KENNETH CLARENCE McLEOD.
OWEN BURGESS HEATLEY.